United States Patent
Sawyers et al.

(10) Patent No.: US 8,111,046 B2
(45) Date of Patent: **\*Feb. 7, 2012**

(54) TECHNIQUE FOR CONVEYING OVERLOAD CONDITIONS FROM AN AC ADAPTER TO A LOAD POWERED BY THE ADAPTER

(75) Inventors: Thomas P. Sawyers, Hempstead, TX (US); James Mun Wai Kok, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 919 days.

This patent is subject to a terminal disclaimer.

(21) Appl. No.: 11/179,919

(22) Filed: Jul. 12, 2005

(65) Prior Publication Data

US 2005/0242786 A1 Nov. 3, 2005

Related U.S. Application Data

(63) Continuation of application No. 10/034,718, filed on Dec. 28, 2001, now Pat. No. 6,950,950.

(51) Int. Cl.
*H02J 7/00* (2006.01)

(52) U.S. Cl. ......... 320/134; 320/160; 320/136; 320/162

(58) Field of Classification Search .................. 320/166, 320/138, 160, 162, 134, 136; 713/322, 330, 713/340
See application file for complete search history.

(56) References Cited

U.S. PATENT DOCUMENTS

| 5,465,039 A | 11/1995 | Narita et al. |
|---|---|---|
| 5,774,347 A | 6/1998 | Nakanishi |
| 5,811,895 A | 9/1998 | Suzuki et al. |
| 6,498,460 B1 | 12/2002 | Atkinson |
| 6,748,547 B1 | 6/2004 | Inoue |
| 6,950,950 B2 * | 9/2005 | Sawyers et al. ............... 713/300 |
| 2003/0126474 A1 | 7/2003 | Sawyers et al. |

OTHER PUBLICATIONS

"DC/DC Converter IC for Charging," MP3878, Fujitsu Semiconductor Data Sheet (DS04-27706-IE, Fujitsu Limited 2000, 24 pp.
Machine translation of Japan 05-241769, Sep. 21, 1993, Toshiba Corp., Takeguchi Kouichirou, 9 pp.
Application Note AN4101, www.fairchildsemi.com, Copyright 2001, Feb. 23, 2001, 16 pp.

* cited by examiner

*Primary Examiner* — Edward Tso
*Assistant Examiner* — Aaron Piggush

(57) ABSTRACT

A constant voltage/constant power AC adapter converts AC voltage to DC voltage to provide power to a plurality of loads. The adapter's output characteristic is approximately a constant voltage as long as the output current draw by the loads is less than a threshold (e.g., a safety threshold for the adapter). If, however, the power draw on the adapter is such that the output current exceeds the threshold, the adapter then decreases its output voltage to maintain the power draw at a safe level. One or more loads that draw power from the adapter may be adapted to detect a drop in the AC adapter's output voltage. When such a voltage drop is detected, that information tells the load that too much current is being drawn from the adapter and that the load should throttle back (e.g., reducing battery charge current, CPU clock frequency, display brightness, etc.).

6 Claims, 4 Drawing Sheets

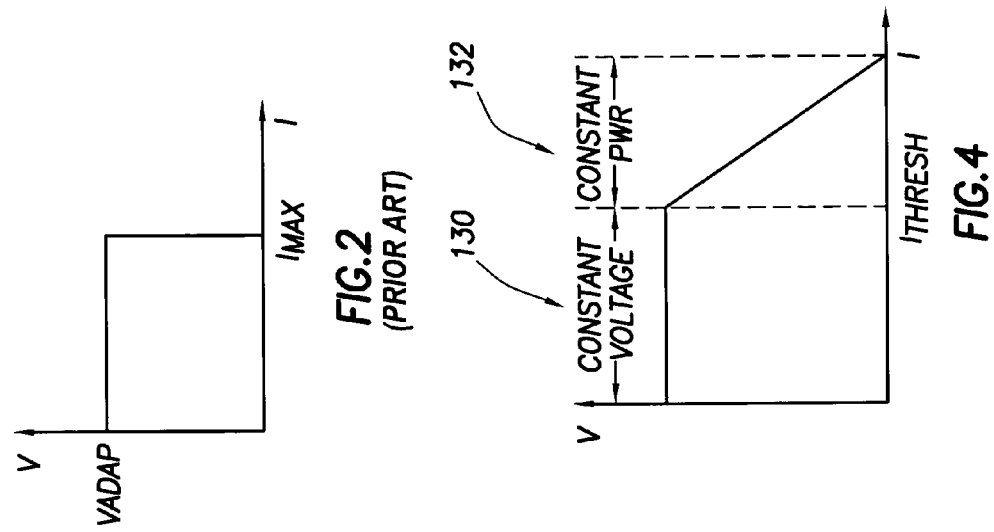
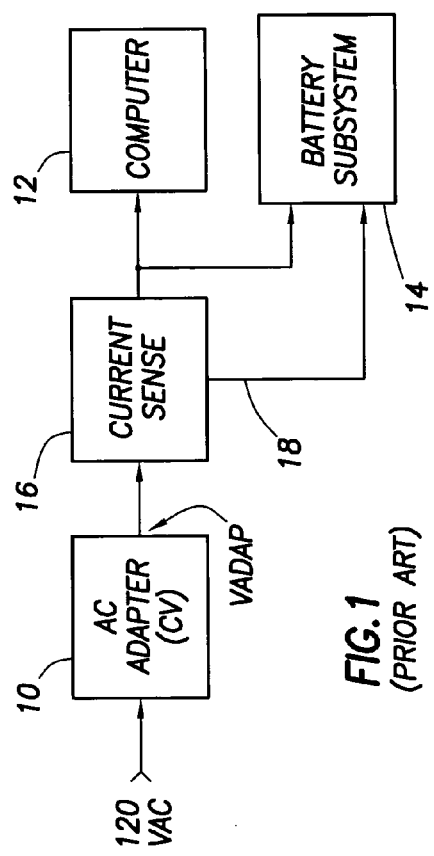
FIG.1 (PRIOR ART)
FIG.2 (PRIOR ART)
FIG.3
FIG.4

TECHNIQUE FOR CONVEYING OVERLOAD CONDITIONS FROM AN AC ADAPTER TO A LOAD POWERED BY THE ADAPTER

CROSS-REFERENCE TO RELATED APPLICATIONS

This application is a continuation of, and claims priority to, U.S. patent application Ser. No. 10/034,718, filed Dec. 28, 2001, entitled "A Technique For Conveying Overload Conditions From An AC Adapter To A Load Powered By The Adapter," incorporated by reference herein as if reproduced in full below.

STATEMENT REGARDING FEDERALLY SPONSORED RESEARCH OR DEVELOPMENT

Not applicable.

BACKGROUND OF THE INVENTION

The present invention generally relates to a battery-powered electronic device. More particularly, the invention relates to a technique for providing power to components in an electronic device in such a way that the devices can determine when an overload condition is occurring.

Most every computer system with a rechargeable battery uses an external AC to DC converter (sometimes called an "adapter") which converts the AC line voltage to a lower DC voltage. An example is shown in FIG. 1 in which an AC adapter 10 provides power for a computer 12 and a battery subsystem 14. The battery subsystem includes a battery charger and a battery. The current sense circuit 16 will be discussed below.

Due to its size and shape, the adapter has often been referred to as the "brick." The brick is usually external to the computer shell and is often an awkward part of the system to store and carry. While using AC power, the brick supplies power both for the normal operation of the computer and also for recharging the battery.

Typical AC/DC converters are provided with an input of 100 to 240 VAC and generate an output voltage of 18 VDC with a total power output capacity of 50 to 70 watts. The size (i.e., power capacity) of the AC adapter is normally established by estimating a reasonable "power budget" for the CPU. The power budget is a total of the maximum power consumption of the computer's internal devices (the CPU, core chipset, LCD panel, hard drive, etc.) plus some allocation for externally powered devices (e.g., USB, PS/2, or external storage).

Older notebook computers with small LCD screens and low power processors typically consumed a maximum of 10 or 15 watts while operational. Today's notebooks, however, with 15" high resolution screen, multiple internal storage drives, and gigahertz processors can easily consume 50 to 60 watts of power. Moreover, performance requirements have demanded bigger AC/DC adapters which are designed to be sufficient for the worst case power consumption of the system.

While the power demands for portable computers continuously increases, the pressure to make the system "mobile" places pressure on the system designer to make the AC/DC brick as small as possible. Ergonomics discourages large AC/DC adapters which dissipate proportionately more heat. Further, cost pressures prohibit the use of more powerful or more efficient AC/DC bricks. Yet, at the same time, it is desirable for the computer to be able to charge the battery as quickly as possible. In sum, many consumers desire portables that have high performance (e.g., fast CPUs, bright displays, etc.), recharge batteries very quickly, are lightweight and small, inexpensive, and do not become hot to the touch.

To date, the concession to AC/DC size has been to "throttle" battery charge when the rest of the system is under full loading. In many older systems, the "power budget" and AC/DC adapter size were calculated by estimating the consumption of the computer, and then allocating an additional amount of power for recharging the battery. Today, the one common concession towards power budget allocation is that power for the recharge of the battery itself is not included in the power budget on which the adapter is designed. This means that most adapters today are rated to provide sufficient power for the computer at full load, but not for charging the battery with the computer at full load. Thus, notebooks today measure the core system power consumption and then allocate the remaining AC/DC power (if there is any remaining power) to charge the battery.

Such conventional systems include, as shown in FIG. 1, a current sense circuit 16 that receives the output voltage from the adapter and passes that voltage on to the computer 12 and battery subsystem 14. The current sense circuit generally includes a low resistance current sense resistor (e.g., 50 milliohms) in series with the power flow to the computer and battery subsystem, as well as an amplifier that amplifies the voltage across the sense resistor. The amplifier circuit is designed so as to assert an output signal 18 when the current out of the adapter exceeds a certain threshold. Conventional AC adapters 10 are constant voltage ("CV") adapters which means their output voltage is regulated to a predetermined value (e.g., 18 VDC) as illustrated graphically in FIG. 2. Because the output voltage is constant, the output current can be used to determine output power. Thus, the output signal 18 from the current sense circuit 16 is asserted, in effect, when the power draw on the adapter by loads 12 (the computer) and 14 (the battery subsystem) nears or exceeds the output power rating of the adapter. In FIG. 2, the over power condition occurs when the current output of the adapter is above Imax.

The current sense circuit output signal 18 typically is provided to the battery subsystem 14 to alert the battery subsystem that the adapter 10 cannot keep up with the power demands of the computer 12 and battery subsystem 14 combined. The battery subsystem 14 uses signal 18 to "throttle" back on battery charge current. Throttling back charge current means to reduce the charge current into the battery. Throttling back charge current results in a lower power draw on the AC adapter thereby alleviating the over power condition. The battery subsystem 14 may even cease battery charging altogether if necessary to protect the adapter 10. By throttling back battery charging, the adapter's output current will not exceed Imax.

Although a generally satisfactory implementation, the current sense circuit 16, which is part of the computer, is not a trivially simple circuit to design. For instance, the amplifier in the circuit may need to be operated rail-to-rail which complicates the amplifier design. Further, voltage level shifting may be required also complicating the implementation. These contribute to error in the resulting current sense output. Accordingly, an alternative system is needed which avoids the problems noted above with the current sense circuit 16.

BRIEF SUMMARY OF THE INVENTION

The problems noted above are solved in large part by sensing output voltage of the AC adapter instead of output current, and using a constant voltage/constant power AC adapter for use in converting AC voltage to DC voltage in providing power to a plurality of loads. The adapter, for example, may be used in a computer system and the loads may comprise the computer and a battery subsystem having a charger and a rechargeable battery. The adapter provides an output characteristic which is approximately a constant voltage as long as the output current draw by the loads is less than a threshold (e.g., the Underwriters Laboratory power rating for the adapter). If, however, the load on the adapter is such that the output current exceeds the threshold, the adapter then regulates its output power to an approximately constant level. Regulating power to a constant level in the face of increasing current includes reducing the output voltage of the adapter.

A preferred embodiment of the adapter includes a primary circuit, which includes a transformer and voltage rectifier, and a secondary circuit. The secondary circuit includes a power regulator and a voltage feedback circuit. The voltage feedback circuit continuously compares the adapter's output voltage to a reference and provides a feedback signal to the primary circuit which responds by adjusting the output voltage so that the output voltage remains at approximately a constant level. The power regulator continuously monitors output current. If output current exceeds a threshold, however, the power regulator provides a signal to the voltage feedback current which, in turn, causes the primary circuit to reduce the output voltage. Thus, as output current increases in excess of the threshold, output voltage is decreased thereby maintaining output power at a constant, yet safe, level.

One or more loads that draw power from the adapter may be adapted to detect a drop in the AC adapter's output voltage. When such a voltage drop is detected, that information tells the load that too much current is being drawn from the adapter and that the load should throttle back to decrease the power draw on the AC adapter. If the load is the battery charger and battery, the charger can throttle back charging by reducing or even ceasing the charge current to the battery. Throttling back charge current results in a lower power draw on the adapter thereby alleviating the excessive power draw condition experienced by the adapter. The load could also be the computer for which the processor could be throttled back by reducing its clock frequency. Alternatively, power could be saved by dimming the display or altering the operation of any other function of the computer.

These and other advantages will become apparent upon reviewing the following disclosure.

BRIEF DESCRIPTION OF THE DRAWINGS

For a detailed description of the preferred embodiments of the invention, reference will now be made to the accompanying drawings in which:

FIG. 1 shows a conventional computer system including a constant voltage AC adapter;

FIG. 2 graphically depicts the constant voltage nature of the AC adapter of FIG. 1;

FIG. 3 shows a computer system having a constant voltage/constant power AC adapter constructed in accordance with the preferred embodiment of the invention;

FIG. 4 graphically depicts the constant voltage/constant power approximation nature of the preferred AC adapter of FIG. 3;

NOTATION AND NOMENCLATURE

Figure 5:
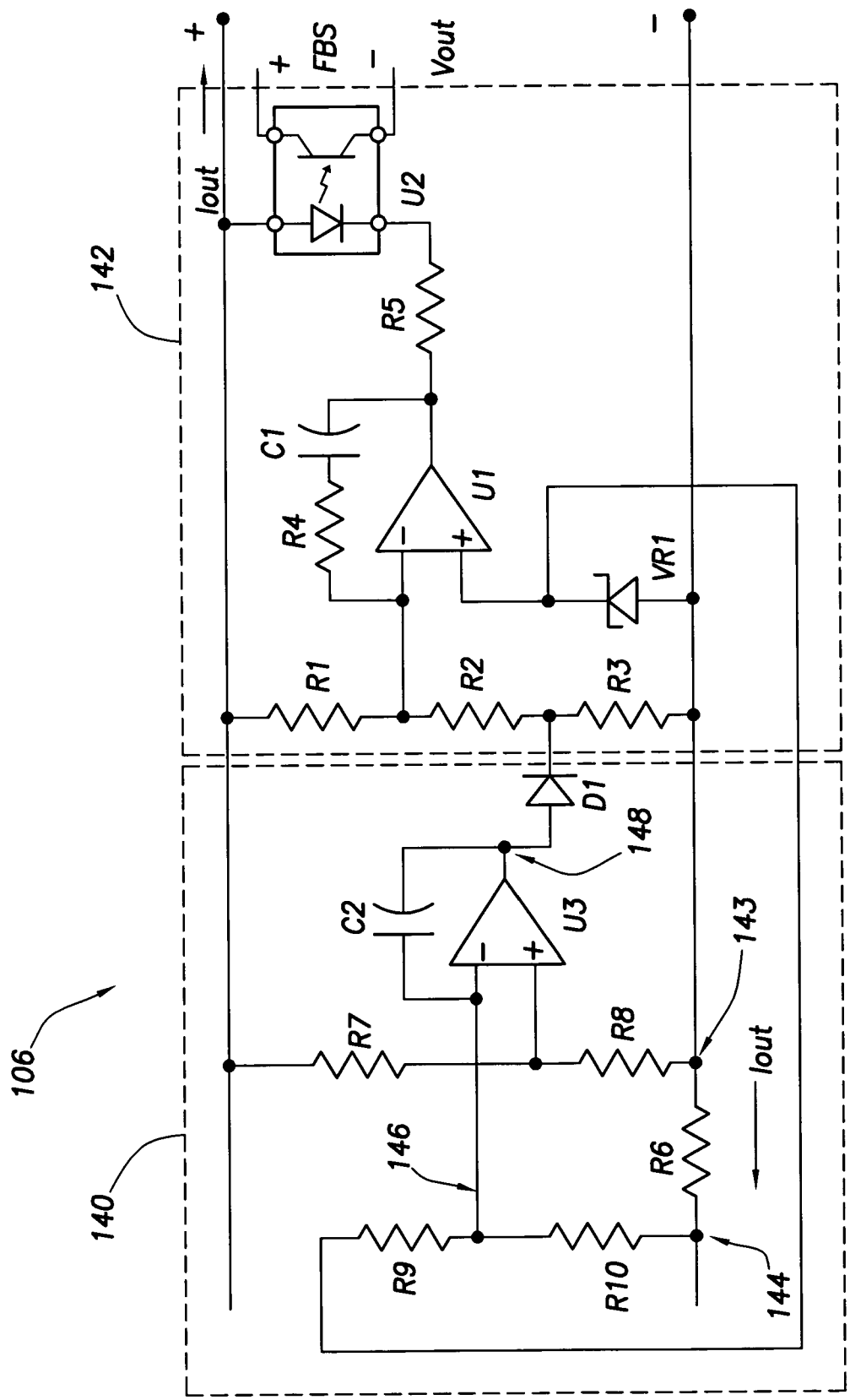
FIG. 5 shows an exemplary circuit in the adapter that provides the constant voltage/constant power output characteristic.

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. In addition, the term "throttling" or "throttling back" a device or system means to change the operating state of the device or system so that the device/system draws less power. For example, throttling back a CPU may include reducing the clock frequency of the CPU. Throttling back a LCD display can be accomplished by dimming the display. To the extent that any term is not specially defined in this specification, the intent is that the term is to be given its plain and ordinary meaning.

DETAILED DESCRIPTION OF THE PREFERRED EMBODIMENTS

Referring now to FIG. 3, computer system 100, constructed in accordance with the preferred embodiment of the invention, includes an AC adapter 102, a computer 110, a battery charger 120, and a battery 124. As shown, the AC adapter 102 converts the incoming AC line voltage to a lower DC output voltage (e.g., 18 VDC) and provides the DC power to the computer 110 and the battery charger 120 to operate those subsystems. Other components may be included as desired.

The computer 110 generally includes one or more CPUs 112, a display (e.g., an LCD display) 114, one or more peripheral or external loads (e.g., PCMCIA cards, modems, CD ROM drive, etc.), and other components known to those of ordinary skill in the art that have been omitted for sake of clarity. For purposes of the preferred embodiment, computer 110 simply represents a load on the AC adapter 102.

The battery charger 120 represents another load on the adapter 102. In general, the battery charger comprises a DC/DC converter which accepts the DC output voltage from the adapter 102 and converts and conditions that voltage to a suitable level for charging battery 124. Although not specifically shown in FIG. 3, battery 120 may include one or more battery cells and a fuel gauge circuit (e.g., the BQ2058 by Texas Instruments) which monitors the current into the battery and reports battery charge status to the charger 120 and/or computer 110.

The salient feature of the architecture depicted in FIG. 3 is that the adapter 102 provides power for driving one or more loads. The loads may include a computer 110 and/or a battery subsystem comprising a charger 120 and a battery 124. However, this disclosure and the claims which follow should not be limited to this particular architecture. The adapter may power other and/or different loads and even be used in an electronic system other than a computer. It should also be understood that the battery, although shown separate from the computer may actually be mounted in the computer 110. It is only being shown separately in FIG. 3 for functional purposes.

The AC adapter 102 of the preferred embodiment has a constant voltage/constant ("CV/CP") power output characteristic which is depicted graphically in FIG. 4. In accordance with the preferred embodiment, the AC adapter's output voltage is regulated to a predetermined constant level in a constant voltage region 130 of its output voltage-current graph. However, once the power draw on the adapter reaches its maximum rating, any further increase in output current caused by loads 110 and 120 will result in a drop in input adapter output voltage. As such, the adapter's output voltage-current characteristic preferably includes a region 132 in which voltage and current vary approximately linearly in an inverse manner (i.e., as current increases, voltage decreases). Because power is the product of voltage and current, region 132 is representative of an approximation of a constant power condition. Thus, the adapter 102 of the preferred embodiment regulates its output voltage until the power draw becomes too high and then reduces its output voltage to maintain a constant (albeit preferably maximum) output power. As described below, the advantage of the constant voltage/constant power adapter 102 described above is that an external current sense circuit is unnecessary.

The AC adapter 102 in FIG. 3 generally includes a primary circuit 104, which includes a step down transformer and a voltage rectifier as would be commonly understood, and a secondary circuit 106. The constant voltage/constant power output characteristic is implemented via circuitry in the secondary circuit 106, an example of which is shown in FIG. 5.

Referring now to FIG. 5, secondary circuit 106 preferably includes a power control circuit 140 coupled to a voltage feedback circuit 142. The circuits 140 and 142 monitor output voltage (Vout) and current (Iout) and provide a feedback signal (FBS) to the primary circuit 104 (FIG. 3) which causes the primary circuit 104 to adjust the output voltage to implement the constant voltage/constant power output characteristic shown in FIG. 4. The feedback signal may be an analog current, or voltage or a digital signal.

Referring still to FIG. 5, the voltage feedback circuit 142 includes an operational amplifier ("op amp") U1, a voltage reference VR1, resistors R4 and R5, capacitor C1 and an optocoupler U2. One of ordinary skill in the art will appreciate that other components may be added the circuit 142 as desired. The output voltage, Vout, is divided down by resistors R1, R2 and R3 and provided to the inverting input of op amp U1. The reference voltage from VR1 is a positive voltage relative to the output ground. The reference voltage from VR1 is provided to the non-inverting input of op amp U1. The op amp essentially amplifies the difference between the reference voltage on the non-inverting input and a divided down version of the adapter's output voltage. In general, when the divided down output voltage exceeds the reference voltage, current is driven through the optocoupler U2 which provides the feedback signal back to the primary circuit 104 which, in turn, reacts causing the output voltage to be lowered. Essentially, the op amp U1 drives the optocoupler U2 to interact with the primary circuit 104 to regulate the adapter's output voltage, Vout. The response of the voltage feedback circuit 142 is partly determined by various compensation components, such as the series combination of resistor R4 and capacitor C1 which are coupled between the inverting input of op amp U1 and the op amp's output pin.

The power control circuit 140 in FIG. 5 comes into play if the adapter is asked to provide too much power by loads 110 and 120 (FIG. 1). As shown, the power control circuit 140 includes an op amp U3, resistors R6, R7, R8, R9 and R10, capacitor C2 and diode D1. Resistor R6 comprises a current sense resistor which is placed in the return (ground) path, so that one end 143 of resistor R6 is at the output ground and the other end 144 is at a lower potential when output current is delivered. A current signal 146 is formed by a resistor divider comprising resistors R9 and R10 between the lower potential end 144 of current sense resistor R6 and the reference voltage produced by VR1. The current signal 146 is the voltage drop across the current sense resistor R6 plus a small positive bias to ensure that the signal is above ground. The current sense signal 146 couples to the inverting input of op amp U3 so that when the adapter's output current increases, the positive voltage at the inverting input of the op amp decreases toward ground.

The adapter's output voltage is divided down by resistors R7 and R8 and provided to the non-inverting input of the op amp U3. Then, when the output voltage (Vout) increases, the voltage at the non-inverting input of op amp U3 increases. In this manner, an increase in the output voltage or output current causes the op amp's output voltage 148 to increase. The output of the op amp U3 will react to the weighted sum of output voltage and output current, which is an approximation of output power.

The response of the power control circuit 140 preferably is made relatively slow by use of a long time constant in compensation capacitor C2 which couples between the op amp U3's inverting input and the op amp's output pin. Having a slowly responding power control circuit helps prevent control loop interactions between the adapter 102 and downstream loads, such as computer 110 and battery charger 120.

Referring still to FIG. 5, the output of op amp U3 preferably is used to raise the feedback voltage of the voltage feedback circuit 142, preferably by driving a current source that feeds current into the inverting input of voltage control amplifier U1 described above. When power regulation amplifier U3 generates an output voltage 148 in response to an excessive current condition, current is driven by the amplifier through diode D1, resistor R2 and into voltage regulation amplifier U1. In this manner, power control circuit 140 can cause the voltage feedback circuit 142 to provide an appropriate feedback signal to the primary circuit 104 to cause the output voltage to be lowered during an over current condition. If the output current is low, the output of the current amplifier U3 will be zero volts, the diode D1 will not conduct, and there will be no effect on the output voltage. If R3 is much smaller than R2, the voltage across R3 will be small. If, however, the output current is high enough, the sum of output voltage and current will cause the current amplifier output to slowly rise enough to drive current, the voltage across R3 will rise, and the output voltage will fall in response. The current loop will respond relatively slowly to changes in current, but the voltage amplifier U1 will still react to changes in voltage, so there will be little effect on ripple voltage rejection. If R3 is much smaller than R2, the mid frequency and high frequency gain of the voltage feedback 142 is not affected by the action of the power feedback 140.

Figure 6:
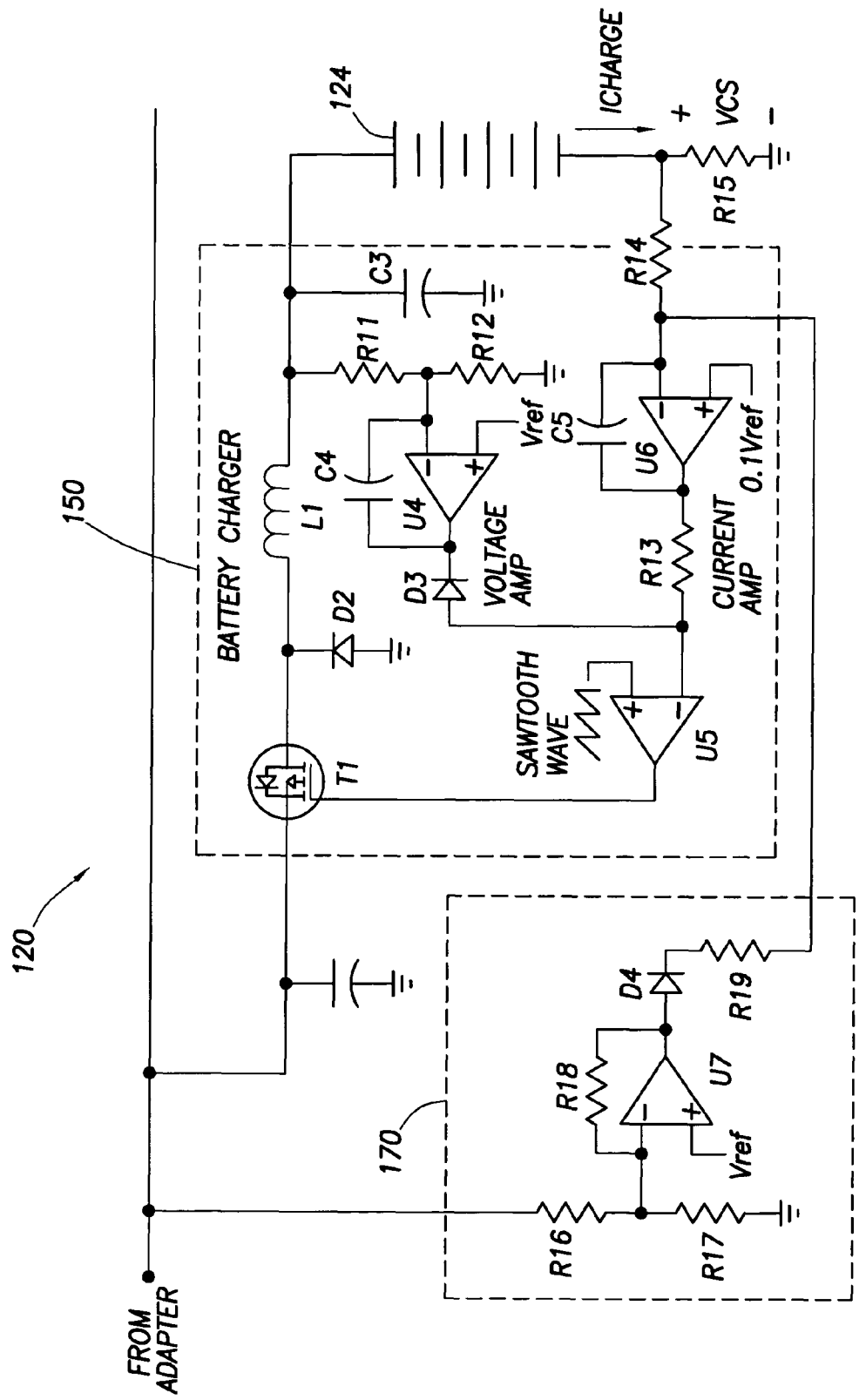
FIG. 6 shows one embodiment for how to use the adapter's output voltage to throttle back battery charge current.
Figure 7:
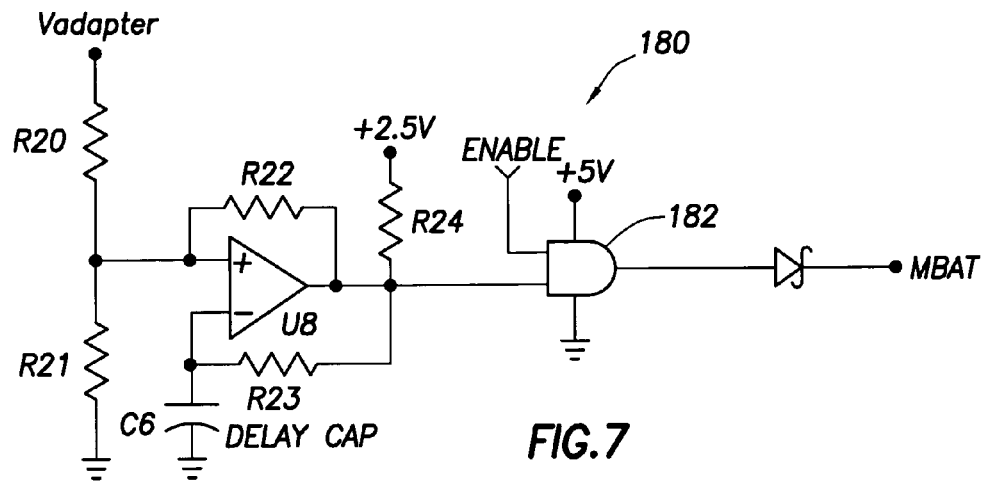
FIG. 7 shows a second embodiment for how to use the adapter's output voltage to throttle back battery charge current.
Figure 9:
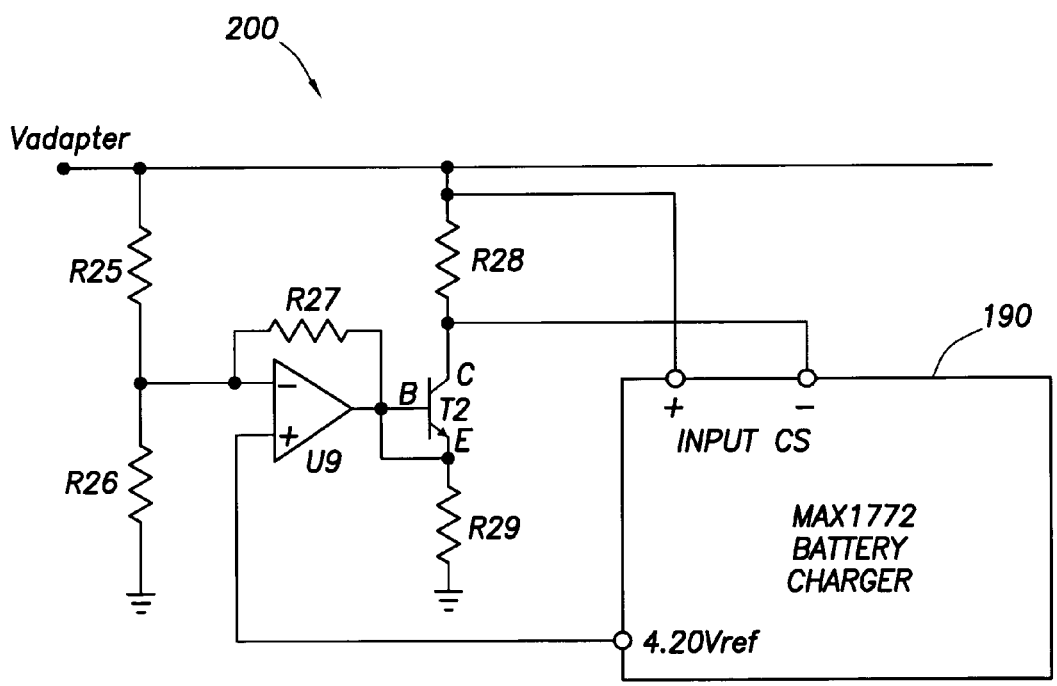
FIG. 9 shows a third embodiment for how to use the adapter's output voltage to throttle back battery charge current.

In summary, the AC adapter 102 of the preferred embodiment provides an output voltage-current characteristic that is a constant voltage until the power draw becomes too great. At that point, the adapter causes its output voltage to drop to maintain its output power at a constant level. The drop in output voltage can be used by other system components as a mechanism to initiate throttling back on some aspect of the system's operation. For instance, and without limitation, the drop in adapter voltage can be used to indicate when battery charging should be throttled back. FIGS. 6, 7 and 9 include three embodiments of how to throttle back battery charging based on a drop in output voltage from a constant voltage/constant power AC adapter.

Referring to FIG. 6, the battery charger 120 is shown functionally to include an adapter voltage detection circuit 170 coupled to a battery charge circuit 150. The battery charger circuit 150 receives output voltage from the adapter 102 and modifies that voltage to produce an appropriate charge current, Icharge, into battery 124. The component architecture shown in FIG. 6 comprising the battery charge circuit 150 is exemplary of a commonly known switching battery charge circuit. The circuit includes a transistor T1, inductor L1, diodes D2 and D3, resistors R11-R15, capacitors C4 and C5 and op amp U4, and comparator U5.

In general, transistor T1 is turned on and off at a rate set by comparator U5. Comparator U5 receives a periodic waveform (e.g., a sawtooth wave) on its non-inverting input and, via resistor R13, the output signal from current amplifier U6 on its inverting input. Resistor R15 is a low resistance current sense resistor (e.g., 40 milliohms) that produces a voltage (Vcs) that is proportional to the charge current (Icharge). The Vcs voltage is provided through resistor R14 to the inverting input of current amplifier U6. A reference voltage (e.g.,0.1V) is provided to the non-inverting input of current amplifier U6. If the charge current is precisely at its predetermined preferred level, then the voltage on the inverting input will be equal to the reference voltage and the output of the current amplifier U6 will be 0 V. If, however, the charge current rises for some reason, then the voltage on U6's inverting input will increase and the output of U6 will be driven lower which, via the action of U5, causes the duty cycle of transistor T1 to decrease. When the output of U5 is low, transistor T1 is on; when U6 output is high, T1 is off. A decreased T1 duty cycle causes the charge current to decrease. If, the charge current falls below its nominal level, the opposite result occurs with T1's duty cycle increasing and causing the charge current to increase. In this manner the charge current is regulated to a predetermined value.

Voltage detection circuit 170 includes an op amp U7, resistors R16-R19 and a diode D4. The adapter output voltage is divided down by resistors R16 and R17 and coupled to the inverting input of U7. A suitable reference voltage couples to the non-inverting input of U7. Resistor R18 comprises a feedback resistor coupled between U7's output and its inverting input. As shown, circuit 170 is configured as an inverting amplifier which amplifies the adapter voltage relative to the reference voltage. If the scaled adapter voltage is greater than the reference voltage on the non-inverting op amp input, the output voltage from the op amp will be 0 V and will essentially do nothing. If, however, the scaled adapter voltage falls below the reference (due to the adapter voltage falling from being overloaded), the output voltage from op amp U7 will be driven positive and drive current through diode D4 and resistor R19 to the inverting input of current amplifier U6. As explained above, as the inverting input of U6 increases, the duty cycle of T1 decreases thereby causing a reduction in charge current. Further, the lower the adapter voltage falls, the greater will be associated reduction in charge current. Thus, the voltage detection circuit 170 is a means to detect a drop in adapter voltage which indicates an excessive load condition and, in response, cause charge current to be throttled back.

An alternative battery charge throttling scheme based on a drop in adapter voltage is shown in FIG. 7. More specifically, FIG. 7 shows an alternative voltage detection and charge current modification circuit 180 which includes a comparator U8, AND gate 182, resistors R20-R24, and capacitor C6. The incoming adapter output voltage is divided down by resistors R20 and R21 and provided to the non-inverting input of comparator U8. Resistor R22 is a positive feedback resistor coupled between the non-inverting input and output of U8. The output of the comparator, which is an open-collector device, is pulled up to a reference voltage (e.g., 2.5V). Capacitor C8 is a timing capacitor that couples between the op amp's inverting input and ground and timing resistor R23 couples between the inverting input and op amp output as shown. This configuration forms an oscillator, with variable frequency that is dependent on adapter voltage.

Figure 8:
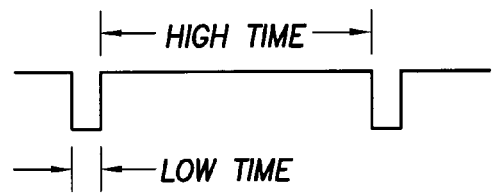
FIG. 8 shows a waveform created by the second embodiment of FIG. 7.

When the adapter voltage is above the charge threshold, the comparator output will be high (pulled up to the reference voltage). When the adapter voltage is in the constant power region in FIG. 4, and falls below the charge threshold, the comparator output will go low for a period of time determined primarily by the values of the timing resistor R23 and capacitor C6. In one preferred embodiment, R23 and C6 may be selected so as to cause the comparator's output to go low for approximately 250 microseconds. The comparator U8 output voltage waveform is depicted in FIG. 8. The duration of the output high state depends on how far the adapter voltage is below the charge threshold. When the adapter is at or above the charge threshold, the comparator output remains high (i.e., high time is infinite). As the adapter voltage decreases, the duration of the high time shortens. The comparator output signal is gated by AND gate 182 and enable signal if desired.

The comparator output signal is used to drive the Master Battery (MBAT) signal which is known in the art to be used in an Intelligent Battery Architecture ("IBA"). When MBAT pulses low, the battery in an IBA system temporarily decreases the charge current, which regulates the power drawn from the adapter. The charge current very slowly rises until another low-going MBAT pulse is generated and again the charge current decreases temporarily. The lower the adapter voltage, the closer together will be the MBAT pulses and the lower will be the average charge current.

Another alternative use of adapter voltage to throttle battery is shown in FIG. 9. FIG. 9 shows a Smart Battery System ("SBS") standard implementation of the charger. The embodiment 200 shown uses a MAX1772 battery charger device 190. Connections to the battery are not shown in FIG. 9. The circuit 200 includes an op amp U9, NPN transistor T2 and resistors R25-R29. A reference voltage (e.g., 4.20 V) is provided by the battery charger device 190 to the non-inverting input of op amp U9. The inverting input of U9 is the adapter voltage divided down by resistors R25 and R26. The op amp output drives the base (B) of transistor T2. Resistor R29 couples the emitter of the transistor to ground. Resistor R27, which couples between the inverting input of U9 and the emitter of transistor T2, provides gain. If the adapter voltage is above the charging threshold defined previously, the op amp output is 0 V, and transistor T2 is off. When the AC adapter 102 falls below the charging threshold, U9's output rises thereby driving an emitter current. The emitter current also flows through the collector resistor, R28, causing a differential voltage across it. The voltage across the collector resistor is coupled to the current sense input pins of the battery charger device 190 as shown. When the adapter voltage falls to the threshold set by the reference voltage on U9's non-inverting input, the differential voltage across R28 exceeds the design threshold and the battery charger 190 responds by reducing charge current.

In summary, the embodiments described herein are directed to an AC adapter that regulates its output voltage until current reaches a maximum level and then regulates its output power for current in excess of the maximum level. Power is regulated at a constant level by reducing voltage with increases in current. Other components in the system can be designed to throttle back on their current demand on the AC adapter in response to detecting a drop in adapter voltage. Several embodiments of throttling back battery charging are shown above. If desired, the computer 110 can throttle itself back as well. Computer throttling can include reducing CPU clock frequency, dimming the display 116 and/or modifying another aspect of computer operation that results in a lower power draw on the adapter 102.

The above discussion is meant to be illustrative of the principles and various embodiments of the present invention. Numerous variations and modifications will become apparent to those skilled in the art once the above disclosure is fully appreciated. For example, the particular circuit implementations shown in the figures may be modified in a number of different ways without departing from the principles and scope of this disclosure. Components can be added or removed from the circuits and different circuits altogether that provide the same benefits and functionality can be used. It is intended that the following claims be interpreted to embrace all such variations and modifications.

What is claimed is:

1. A computer system, comprising:
   a CPU;
   a battery subsystem having a battery and a battery charger;
   an AC adapter coupled to the CPU and the battery subsystem, the AC adapter regulating its output voltage for variations in output current until the output current reaches an overload condition threshold above which the adapter regulates its output power by decreasing the output voltage as the output current increases; and
   a detection circuit separate from the AC adapter and coupled to the battery subsystem, wherein the detection circuit detects the output voltage from the AC adapter, wherein the detection circuit dynamically directs the battery charger to throttle current to the battery based on the AC adapter being in the overload condition, an amount of current throttle being proportional to an amount of change in the detected output voltage.

2. The system of claim 1, wherein, during the overload condition, the rate of increase in the output current is less than the rate of decrease in the output voltage.

3. The system of claim 1, wherein the adapter includes a transformer and a power control circuit coupled to a voltage feedback circuit, the voltage feedback circuit provides a feedback signal to the transformer to regulate the output voltage from the adapter, and the power control circuit causes the voltage feedback circuit to cause a reduction in the adapter's output voltage when the output current exceeds the threshold.

4. The system of claim 1, wherein the output current is inversely proportional to the output voltage while the adapter is in the overload condition.

5. A computer system, comprising:
   a CPU;
   a battery subsystem;
   a means for regulating an AC adapter's output voltage;
   a means for regulating an AC adapter's output power at an approximately constant power level when the adapter's output current exceeds a threshold by decreasing the output voltage as the output current increases;
   a means for monitoring an AC adapter's output voltage to detect an overload condition, said means for monitoring being separate from an AC adapter; and
   a means for dynamically throttling a current to a variable load of the computer system based on the AC adapter being in the overload condition, wherein said means for dynamically throttling is separate from the AC adapter;
   wherein an amount of current throttle is proportional to an amount of change in the AC adapter output voltage.

6. The system of claim 5, wherein the means for dynamically throttling controls a duty cycle for a battery charge current.

* * * * *